March 1, 1932. R. N. ROBERTSON ET AL 1,847,307
FLUID SEPARATOR SHIELD
Filed June 17, 1927
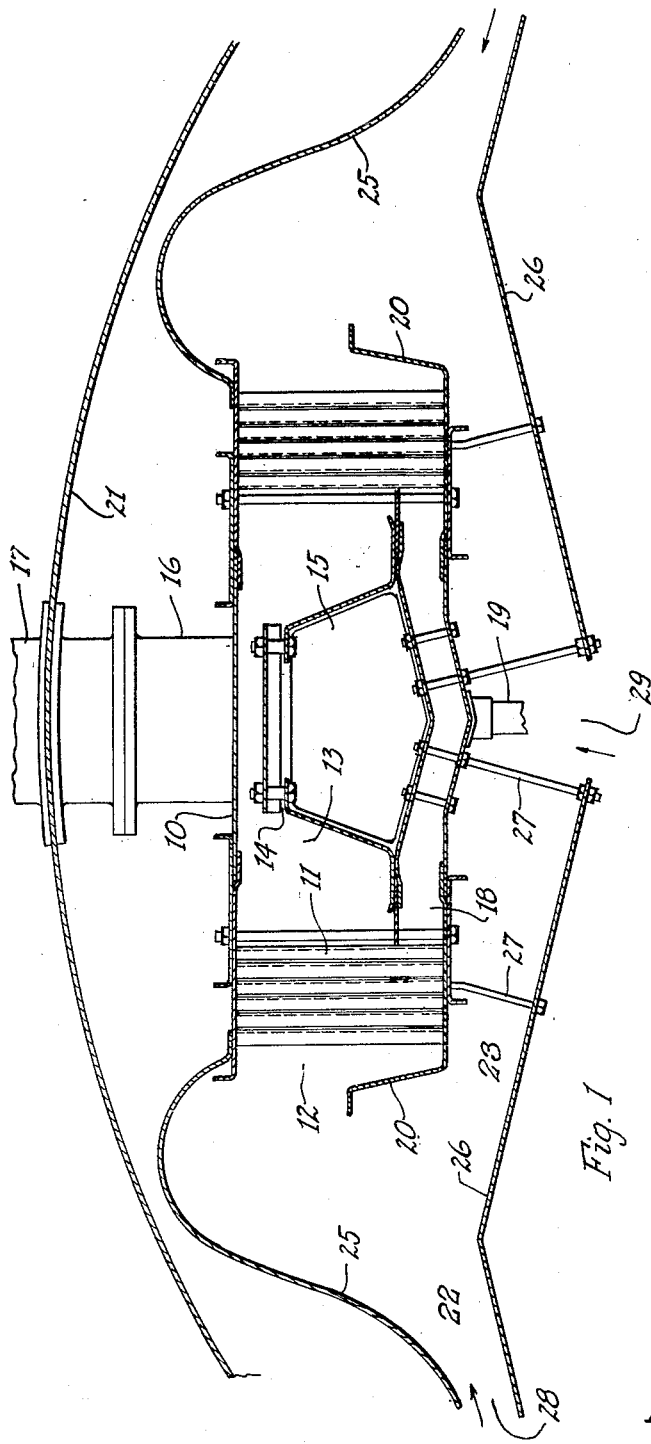
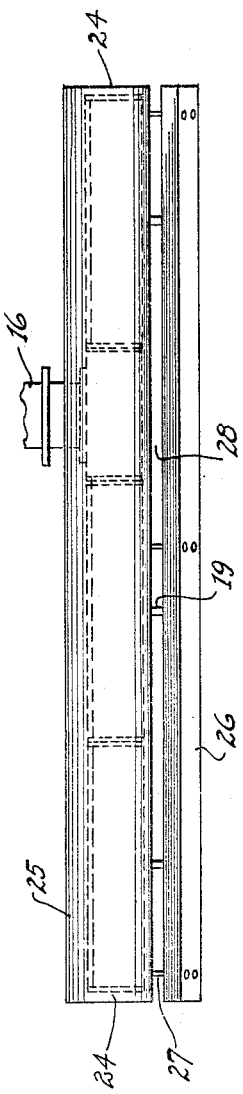
INVENTORS:
Ralph N. Robertson
Philip H. Miner
By E.J. Andrews
Atty.

Patented Mar. 1, 1932

1,847,307

UNITED STATES PATENT OFFICE

RALPH N. ROBERTSON AND PHILIP H. MINER, OF PITTSBURGH, PENNSYLVANIA, ASSIGNORS, BY MESNE ASSIGNMENTS, TO BLAW-KNOX COMPANY, OF BLAWNOX, PENNSYLVANIA, A CORPORATION OF NEW JERSEY

FLUID SEPARATOR SHIELD

Application filed June 17, 1927. Serial No. 199,513.

This invention relates to fluid separators for drying and purifying gases and particularly to steam separators which are mounted in boilers for the purpose of removing the moisture and other impurities from the steam before it passes from the boiler. One of the objects of the invention is to provide various plates or shields for preventing water from being sprayed or thrown into the separator by the belching up of the water owing to sudden decreases in steam pressure or intense fire action, or any other abnormal or exceptional process, and to direct, into the separator, streams of steam from portions of the boiler that are not affected so much by the belching or geyser actions of the water in the boiler. Another object of the invention is to provide improved means for separating the moisture from the gas after the gas has entered the separator.

Of the accompanying drawings Fig. 1 is a transverse sectional elevation of a steam separator mounted in a boiler, with shields attached thereto, which embodies the features of our invention; Fig. 2 is a reduced side elevation of the separator.

Although our invention is applicable to any ordinary form of steam separators, yet we have illustrated and described our invention as applying to the type of steam separator which is known by the trade as the "Tracyfier". This separator comprises a casing 10 in the sides or inlets 12 of which are mounted banks of baffles 11 for drying and purifying the steam as it passes through from the inlet 12. The steam passes through the baffles to the interior chamber 13 and thence through passageways 14 to an inner conduit 15 and then out from the conduit 15 through the outlet 16 to the steam main 17 of the boiler. The moisture separated from the steam in the separator passes downwardly to the lower ends of the baffles and into a chamber 18 and out of the drain pipe 19. It has been usual to apply to these steam separators plates 20 which extend along each side of the separator and prevent some of the water from being thrown into the separator.

We find, however, that the purification of the steam can be improved by the insertion in proper places of other plates or shields of proper shape. In the agitation of the water in the boiler, especially certain types of boilers, there are streams, or at least slugs of water that are thrown upward and along the upper wall of the boiler, and these streams often turn downwardly about the time the sides of the separator are reached and plunge more or less water into the baffles of the separator. To prevent these and similar streams or slugs of water from entering the baffles we provide, on each side of the separator, shields 25 which are fixed to the upper side of the separator and are curved upwardly and then downwardly somewhat as indicated. The exact curvature, however, of the shields is not essential to our invention. The streams of water directed along the upper wall of the boiler thus pass over the shields 25 onto the separator and flow back into the boiler, or much of the water is caught by the shield itself and flows down the sides.

To prevent streams or slugs of water from being thrown upwardly under the shields 25, or into the separator baffles directly, we provide shields 26, preferably on each side of the separator, and preferably bent somewhat as indicated. These shields as well as the shields 25, may be connected to the separator or to the wall of the boiler in any suitable manner. We prefer to connect the shields 26 to the lower wall of the separator by means of bolts 37.

By this arrangement it will be seen that the steam must enter the separator either at the remote ends 24 of the separators or through the openings 28 or 29 and the passageways 22 and 23; and as the inlet to each of these openings is a material distance from the baffles of the separator any slugs of moisture contained in the steam will ordinarily drop out of the stream of steam before it reaches the baffles, particularly as the shields 20 aid in such elimination of the water.

We claim as our invention:

1. A steam separator comprising a casing having a top and a bottom wall spaced a material distance apart, a plurality of spaced vertical baffles mounted between said walls, steam shields outside of said baffles fixed to said top and bottom walls respectively and forming circuitous vertical, waving passageways for the steam passing to said baffles, said passageways having two steam inlets, and an outlet facing said baffles positioned above and between the inlets to the passageways, whereby the steam in passing to and through said separator travels along vertically waving paths to and through said baffles.

2. A steam separator comprising a casing having a top and a bottom wall spaced a material distance apart, a plurality of vertical baffles mounted between said walls, steam shields outside of said baffles fixed to said top and bottom walls respectively and forming a circuitous passageway for passing the steam to said baffles, said passageway having an outlet facing the upper ends of said baffles, said passageway arranged to direct the steam downward through said outlet towards the lower ends of said baffles.

3. A steam separator as claimed in claim 2, which has a steam outlet for said baffles positioned inside of and along the upper ends of the baffles.

4. A steam separator having a steam inlet and a steam outlet, a plurality of rows of vertical baffles positioned between said inlet and outlet, a plate positioned outside of said baffles and extending from the lower ends of said baffles upwardly and forming the lower edge of said inlet, and a curved baffle external of and above said inlet for directing the steam downwardly through said inlet and towards the lower ends of the baffles.

5. A steam separator having a steam inlet and a steam outlet, a plurality of rows of vertical baffles between said inlet and outlet, said inlet being formed in part by a plate outside of said baffles and extending from their lower ends upwardly a very material distance, and means external of and above said inlet for directing the steam downwardly through said inlet and towards the lower ends of the baffles, said outlet being positioned along the upper ends of said baffles, whereby the steam is distributed somewhat uniformly through all portions of said baffle system.

In testimony whereof we hereunto set our hands.

RALPH N. ROBERTSON.
PHILIP H. MINER.